Dec. 11, 1928.  
J. D. LANGDON  
1,694,880  
AIRSHIP  
Filed March 31, 1927  
2 Sheets-Sheet 1
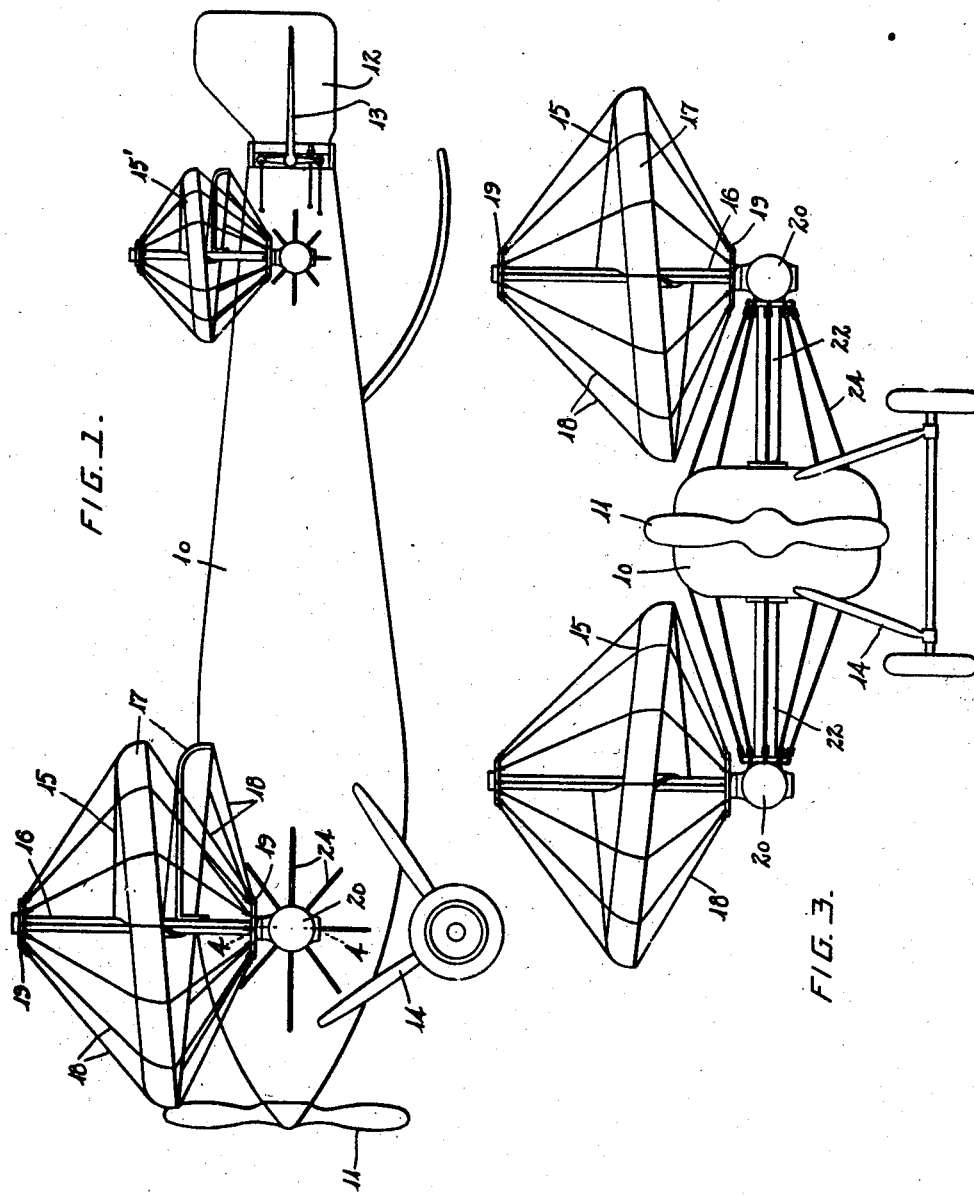
Inventor:  
J. D. Langdon  
By Monroe E. Miller  
Attorney.

Dec. 11, 1928.　　　　　　　J. D. LANGDON　　　　　1,694,880
　　　　　　　　　　　　　　　　　AIRSHIP
　　　　　　　　　　　Filed March 31, 1927　　2 Sheets-Sheet 2
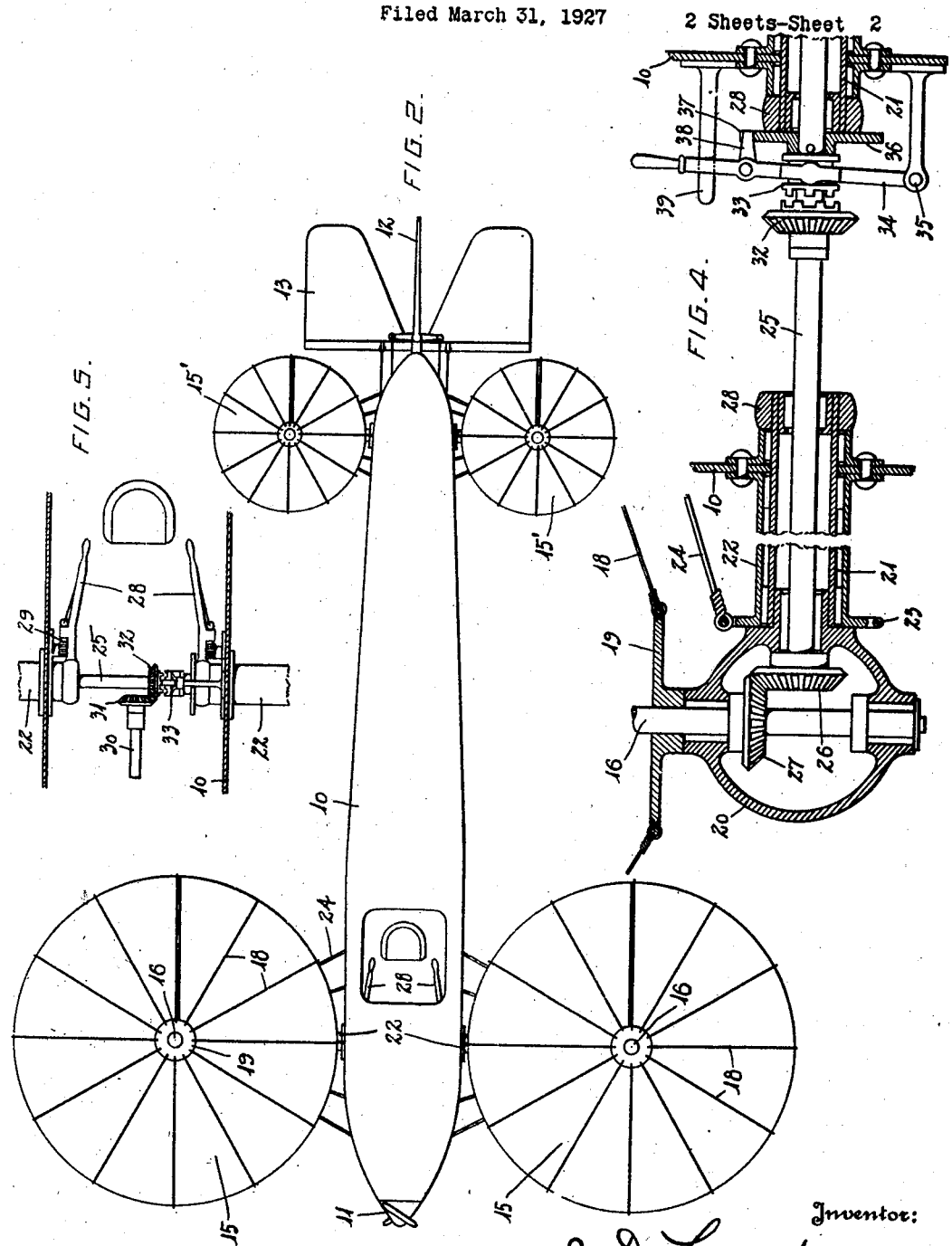
Inventor:
J. D. Langdon
By Monroe E. Miller
Attorney.

Patented Dec. 11, 1928.

1,694,880

UNITED STATES PATENT OFFICE.

JESSE D. LANGDON, OF LOS ANGELES, CALIFORNIA.

AIRSHIP.

Application filed March 31, 1927. Serial No. 179,909.

The present invention relates to airships, and aims to provide a combination airplane and helicopter.

Another object of the invention is the provision of an aircraft having helices for lifting the aircraft vertically, and which are also used as wings when the aircraft operates as an airplane.

A further object is the provision of an airship having novel elements serving both as airplane wings and lifting propellers, as well as providing a parachute effect when descending.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the improved airship.

Fig. 2 is a top plan view thereof.

Fig. 3 is a front view thereof.

Fig. 4 is an enlarged sectional detail on the line 4—4 of Fig. 1.

Fig. 5 is a detail plan view showing the control levers.

In carrying out the invention there is provided a fuselage or body 10 of suitable elongated form, similar to that used in airplanes, which has a propeller 11 at its forward end, and a steering rudder and elevator 13 at its rear end, like the ordinary airplane, with a suitable landing gear 14.

At opposite sides of the body 10, where the usual airplane wings are located, are the helices or combination lifting propellers and wings 15. Said helices are of disk shape in plan, and each of them comprises a sheet metal or other suitable blade extending through substantially a complete circle, with the helix or blade having a radially split or divided portion between the ends thereof which are offset vertically. The helices are suitably secured on upwardly extending shafts or spindles 16, and said helices have downturned rims 17 to prevent the air from escaping from under the edges of the helices, and the helices thus also have a parachute effect to facilitate descent, as well as slowing the descent in case of engine failure. The rims or marginal edges of the helix blades are connected by guy or stay wires 18 with collars or flanges 19 on the shafts 16 above and below the helices.

The helices are mounted from the body 10 for tilting movement about a transverse axis. Thus, the lower terminals of the shafts 16 are journaled for rotation in heads or gear cases 20 secured to the outer ends of transverse tubular shafts 21 which are mounted for turning movement in tubular outriggers 22, which outriggers have flanges 23 at their outer ends connected by guy or stay wires 24 with the body 10. Thus, the shafts 21 may be turned in the outriggers 22 for tilting the shafts 16 and helices about the transverse axis of said shafts 21.

A transverse shaft 25 is mounted for rotation in the shafts 21 and heads 20 and has bevel gears 26 at its ends meshing with bevel gears 27 on the shafts 16, for driving the shafts 16 and helices.

In order to tilt the helices relatively to the body 10, control levers 28 are secured to the inner ends of the shafts 21, within the body 10, to be conveniently swung by the pilot or operator, and suitable means 29 are provided for holding said levers in different positions, as well known. The levers in being swung will turn the shafts 21, and said shafts may be controlled individually so that the helices at the opposite sides of the body may be tilted to different angles.

The drive shaft 30 of the engine (not shown) has a bevel gear 31 meshing with a bevel gear 32 rotatable loosely on the shaft 25, and a clutch 33 slidable on and rotatable with the shaft 25, and is controlled by a hand lever 34 fulcrumed, as at 35, within the body. The shaft 25 may thus be conveniently connected with and disconnected from the engine.

The helices 15 also serve as airplane wings when the airship is changed from a helicopter to an airplane, and the helices 15 are stopped with their split portions at the rear of the shafts 16, as shown in Figs. 1, 2 and 3. In order to stop the helices in such position, a disk 36 is secured on the shaft 25 adjacent to the lever 34 and has a notch 37 for the engagement of a dog 38 carried by said lever 34, the lever 34 being movable along a guide 39 carried by the body 10. Thus, when the clutch 33 is opened, as seen in Fig. 4, to stop the rotation of the helices 15, the dog 38 is moved into the notch 37, thereby stopping the helices with the split portions in rear of the shafts 16. When the lever 34 is swung to close the clutch 33, and thereby rotate the helices, the dog 38 is retracted from the notch 37, thereby unlocking the shaft 35. Therefore, when the clutch 33 is opened and closed the locking means or dog 38 is brought into and out of engagement with the disk 36.

The airship is thus quickly converted from a helicopter into an airplane, and vice versa. The airship may thus take off vertically into the air when making its ascent as a helicopter, in which event the lever 34 is swung to close the clutch 33, whereby the helices 15 are rotated to lift the airship, and as shown, a supplementary or auxiliary pair of helices 15' is also provided at the opposite sides of the body 10 near the rear end thereof, being controlled the same as the helices 15. The shafts 21 may be turned by means of the levers 28, so as to position the shafts 16 vertically or to incline them forwardly or rearwardly, in order to control the upward direction of motion. After the airship has ascended it may be converted into an airplane by swinging the lever 34 to open the clutch 33 and bring the dog 38 into the notch 37, whereby the helices 15 are locked in position with their split portions at the rear of the shafts 16. The helices 15 then provide wings, and their angles of incidence may be changed by turning the shafts 21. Thus, the helices or wings may be adjusted to the same angle or may be adjusted to different angles to serve as ailerons. When making a descent the airship may again be converted into a helicopter so that the airship may descend downwardly slowly to make a landing within a small space, the speed of the helices 15 being slowed down sufficiently to permit the airship to descend. In the event of the failure of the engine, the helices serve as parachutes so as to retard the fall of the airship.

Having thus described the invention, what is claimed as new is:—

1. An airship having a propeller for forward propulsion, a helicopter helix comprising a blade extending through substantially a complete circle and disk shaped in plan with a radial split portion at the ends of the blade, means for mounting said helix for angular adjustment forwardly and rearwardly, and means for locking the helix against rotation with the split portion thereof at the rear.

2. An airship comprising a body, a substantially vertical shaft connected with the body for rotation about its axis and for forward and rearward tilting movement about a transverse axis, a helicopter helix carried by said shaft comprising a blade disk-shaped in plan and extending through substantially a complete circle with a radial split portion between the ends thereof, the marginal portion of the blade being downturned, guy wires between the marginal portion of said blade and the shaft, means for locking said shaft against rotation with the split portion of the helix in rear of the shaft, and a propeller carried by the body for forward propulsion.

3. An airship comprising a body, a propeller for forward propulsion carried by the body, helicopter helices at the opposite sides of the body, means for connecting said helices with the body for rotation about their axes and for forward independent and rearward tilting adjustment about a transverse axis, and means for locking the helices against rotation in a predetermined position thereof, said helices when in said position serving as airplane wings.

4. An airship comprising a body, a propeller for forward propulsion carried thereby, independent tubular shafts carried by the body at opposite sides thereof and arranged transversely, substantially vertical shafts carried by said tubular shafts for rotation about their axes and to be tilted forwardly and rearwardly with said tubular shafts, a transverse shaft extending through the tubular shafts and geared to said second-named shafts, helicopter helices on the second-named shafts and of a shape to serve as airplane wings in a predetermined position thereof, means for turning said tubular shafts to tilt the helices forwardly and rearwardly, and means for locking the third-named shaft with said helices in said position.

5. An airship comprising a body, a propeller for forward propulsion carried by said body, transverse tubular shafts mounted in the body at opposite sides thereof, heads carried by the outer ends of said shafts, upwardly extending shafts mounted for rotation in said heads, helicopter helices on said upwardly extending shafts and comprising blades disc-shaped in plan and extending through substantially a complete circle with a radial split between the ends of each blade, a transverse shaft extending through said tubular shafts and geared to said upwardly extending shafts, means for turning said tubular shafts, and means for locking the last-named shaft against rotation with the split portions of the helices in rear of said upwardly extending shafts.

6. An airship comprising a body, and a helicopter helix mounted thereon comprising a blade extending through substantially a complete circle and disk shaped in plan with a radial split portion at the ends of the blade, the marginal portion of said blade being downturned.

In testimony whereof I hereunto affix my signature.

JESSE D. LANGDON.